Dec. 10, 1957 W. W. LOGAN 2,816,177

DICTATION RECORDING MACHINES AND SYSTEMS

Filed Oct. 14, 1955 4 Sheets-Sheet 1

INVENTOR
William W. Logan
BY George H. Fritzinger
Agt.

Dec. 10, 1957 W. W. LOGAN 2,816,177

DICTATION RECORDING MACHINES AND SYSTEMS

Filed Oct. 14, 1955 4 Sheets-Sheet 2

INVENTOR

William W. Logan

BY George H. Fritzinger

Agt.

DICTATION RECORDING MACHINES AND SYSTEMS

Filed Oct. 14, 1955 4 Sheets-Sheet 3

INVENTOR
William W. Logan
BY George H. Fritzinger
Agt.

Dec. 10, 1957 W. W. LOGAN 2,816,177

DICTATION RECORDING MACHINES AND SYSTEMS

Filed Oct. 14, 1955 4 Sheets-Sheet 4

INVENTOR
William W. Logan
BY George H. Fritzinger
Agt.

United States Patent Office 2,816,177

Patented Dec. 10, 1957

2,816,177

DICTATION RECORDING MACHINES AND SYSTEMS

William W. Logan, Glen Ridge, N. J., assignor, by mesne assignments, to McGraw-Edison Company, Elgin, Ill., a corporation of Delaware Application October 14, 1955, Serial No. 540,370

18 Claims. (Cl. 179—100.1)

The present invention relates to dictating machines, and more particularly to novel control arrangements for enabling a dictator to listen back to any selected portion of his recorded dictation and to thereupon resume the recording operation with a minimum of attention to the machine. The invention is particularly adapted to dictating machine systems wherein the machine is controlled from one or more remote dictators' stations, and is herein described in connection with such systems but without intending any unnecessary limitation thereto. Although the invention is described in connection with a machine which is adapted for cutting or embossing a modulated groove on a record medium, the invention is applicable as well in its many aspects to recording and reproducing machines adapted for operation on a magnetic or other record medium.

A dictating machine is normally provided with facility to enable the dictator to "listen back" at any time to any desired portion of his recorded dictation so that he may refresh his train of thoughts in his mind as desired, as after an interruption. To this end, it is desirable that the dictating machine have a minimum number of controls. It is known to provide only one or two controls for enabling selective operation of the machine for recording or for listening back, but prior art has required special manipulations of these controls, such as a selection between two directions of movement or a selection of sequence of different manipulations. Such mode of control of a machine is undesirable because it requires a thought process which distracts the dictator's attention away from the subject matter to be recorded.

The present invention relates to a control arrangement which comprises two control members for selective operation of the machine for recording or for reproducing. These control members are normally both in released or neutral positions. To record, the dictator need press only one of these control members, and to listen back he need only press the other. To facilitate the description, these controls may be termed the "record" and "listen" buttons. Since listening back to one's recorded dictation requires several control operations on the machine, the pressing of the listen button is adapted to perform the following operations: (1) the machine is shifted from recording to reproducing, (2) the record-cooperable reproducing unit is engaged with the record at a point backspaced from the point of farthest advance of the recording unit (this may or may not require backspacing of the carriage in the first instance, depending upon whether the reproducing unit is offset from the recording unit), and (3) the machine is started to resume rotation of the record and to advance the carriage for the recording and reproducing units. In order that the dictator may also listen back to any selected portion of his recorded dictation, he can vary the amount of backspacing of the carriage according to the number of times he presses and releases the listen button. Thus the dictator will press the listen button repeatedly until he has backspaced the carriage step by step by the desired amount and will then continue to hold the listen button down to start the reproducing operation. Such manipulation of the listen button is a very natural one requiring no conscious thought on the part of the dictator. Also, the resumption of recording requires no conscious attention of the dictator since it is effected simply by releasing the listen button and pressing the record button.

In recording machines which cut or emboss on the record, the carriage must always be restored at least to its prior position of farthest advance after each backspacing thereof, but this is not necessary with magnetic recording machines because of their erasing facility; however, even with such machines, the carriage would have to be likewise advanced to the position of farthest advance if one is to resume recording from the point of one's last bit of dictation.

An object of my invention is to provide an improved control system for dictation recording and reproducing machines which enables an operator to record dictation simply by pressing one control member and to reproduce his recorded dictation at selected points simply by pressing one or more times and then holding down another control member.

Another object of my invention is to provide a novel and improved mechanism which will automatically restore the machine for resumpion of recording beyond the point of farthest advance whenever a dictator finishes listening back to some selected intermediate portion of his recorded dictation.

In remotely-controlled dictation-recording systems the dictator's equipment at the remote station includes typically an on-off station switch which is moved to on position to connect the dictator's equipment operatively to the machine, such system being described for example in the Kobler Patent No. 2,650,951, issued September 1, 1953. Whenever a dictator finishes using the machine, he will return this station switch to off position in order to free the machine for independent use by another dictator from his own or another station. Customarily, the station switch is operated to off position by a cradle provided for supporting the dictator's handpiece when the machine is not in use. A further object of my invention is to provide for automatic restoration of the carriage to or beyond its prior position of farthest advance whenever the dictator places his handpiece on its support while the carriage is in a backspaced position.

Another object is to provide for automatic restoration of the carriage to or beyond its prior position of farthest advance as an incident to the elapse of a preset time interval following release of the listen button while the carriage is in a backspaced position. A further object is to provide for such automatic restoration only upon release of the listen button and subsequent operation of the record button.

Another object is to provide a suitable signal to apprise the dictator whenever the carriage is backspaced from a position of farthest advance.

Another object is to provide a novel advance marker for the carriage and locking means therefor to hold the marker in place while the carriage is backspaced from a prior position of farthest advance. Another object is to provide a novel arrangement including displaceable abutting elements on the carriage and marker for releasing the marker only when the carriage has been moved a preset distance beyond its prior position of farthest advance. Still another object is to provide for automatic return of the marker with the carriage whenever the carriage is backspaced for other than a "listen back" operation.

Another object is to provide a stepping mechanism for shifting the carriage step by step, which mechanism is provided with directional means for conditioning the mechanism for shifting the carriage either forwardly or backwardly.

Another object is to control said directional means by said listen button to cause the stepping mechanism to be conditioned for backspacing when the listen button is depressed and for advancing the carriage when the listen button is released.

These and other objects and features of my invention will be apparent from the following description and the appended claims.

In the description of my invention reference is had to the accompanying drawings, of which:

Figure 1 is a top plan view of a dictating machine embodying my invention, showing the machine with the housing removed and parts broken away;

Figure 1*a* is a fractional, sectional view taken on the line 1*a*—1*a* of Figure 1;

Figures 1, 1A, 2:
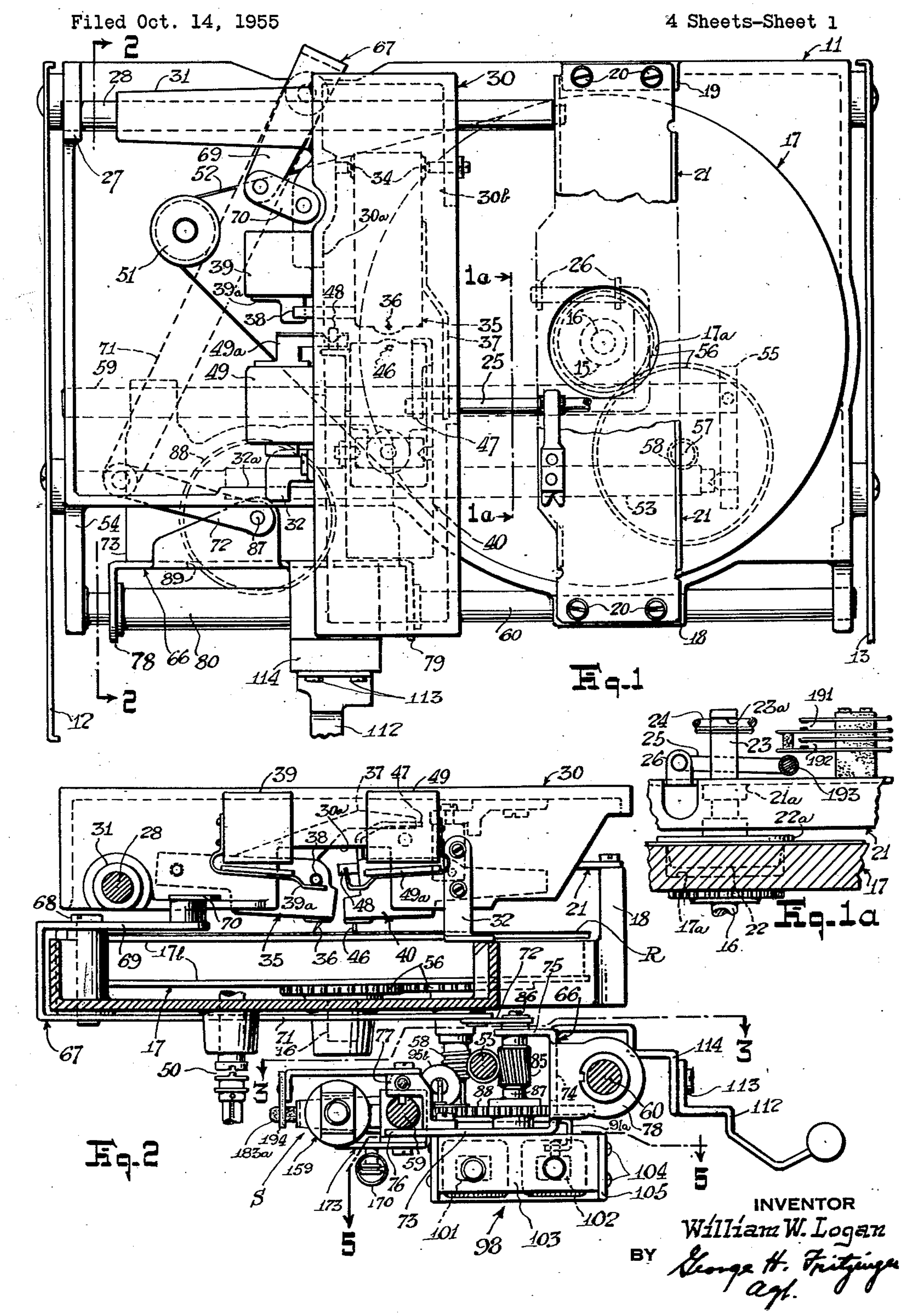
Figure 2 is a vertical, sectional view taken on the line 2—2 of Figure 1.

The present illustrative machine shown in the drawings is of the form generally shown and described in the pending application of Richard Kobler, Serial No. 436,796, filed June 15, 1954 (now Patent No. 2,800,531, dated July 23, 1957), and having common ownership with the present application. Such machine has a main frame plate 11 supported on side plates 12 and 13 and provided with a bearing 15 in its central righthand portion in which is journaled a depending shaft 16 of a turntable 17. Spanning the turntable from front to back is a bridge 21 secured by screws 20 onto front and back standards 18 and 19 integral with the frame plate 11. This bridge carries a record-clamping mechanism which need not be herein described in detail since the same is described fully in Dann et al. Patent 2,524,561, dated October 3, 1950. Suffice to say for the present purposes that the turntable 17 has a large circular opening **17*a* at the center thereof which is engageable by a frusto-conical clamping member 22 provided with a rim flange 22*a*. This clamping member is mounted rotatably on the lower end of a vertical plunger 23 carried in a bearing 21*a* on the bridge 21. The record clamp is operable vertically by means including a cross rod 24** (fractionally shown in Figure 1*a*) which engages a cross slot **23*a* in the upper part of the plunger, this operable means being also coupled to a lifting rod 25, partially shown by dash-dot lines in Figure 1, to raise and lower the rod as the record is unclamped and clamped respectively. The lifting rod has a U-shaped portion the shorter leg of which is pivoted in apertured lugs 26** struck upwardly from the bridge and the longer leg of which constitutes a lifting arm for the recorder and reproducer units hereinafter described.

At the rear of the machine there is a cross rod 28 carried at one end by a standard 27 and at the other end by the bridge 21. This rod supports the rear portion of a carriage 30 for the recording and reproducing units. The carriage has a long bearing 31 slidably fitting this rod and has a forward foot 32 slidably engaging a rail **32*a* on the frame plate 11. The carriage is in the form of a hollow rectangular frame having a depending flange 30*a* along its left side and flanges 30*b* along the rearward and forward portions at its right side. Pivoted to the rearward portion at 34 is a recording unit 35 having a stylus 36 adapted for cutting or embossing a groove in a record disk R on the turntable. Extending forwardly from the recording unit is a lift arm 37 which overlies the aforementioned rod 25. When the record-clamping mechanism is actuated and released, the rod 25 is lowered and raised respectively to cause the recording unit to engage the record and to be released therefrom. A further device for lifting the recording unit comprises a lift pin 38 projecting from the left side thereof and an electromagnet 39 mounted on the carriage and having an armature 39*a*** operable against the lift pin to raise the recording unit as the electromagnet is energized.

In the forward portion of the carriage there is a reproducing unit 40 having a universal pivotal connection adapted to enable the reproducer to be moved both vertically and laterally. This reproducer has a stylus 46 at its free end for engaging the modulated groove in the record R. Also, at the free end of the reproducer there is a lift arm 47 which overlies the rod 25 aforementioned. Still further, the reproducer has a lift pin 48 extending from the free end thereof which is engageable by an armature **49*a* of an electromagnet 49 mounted on the carriage 30** for raising the reproducer from the record whenever the electromagnet is energized.

Figure 8:
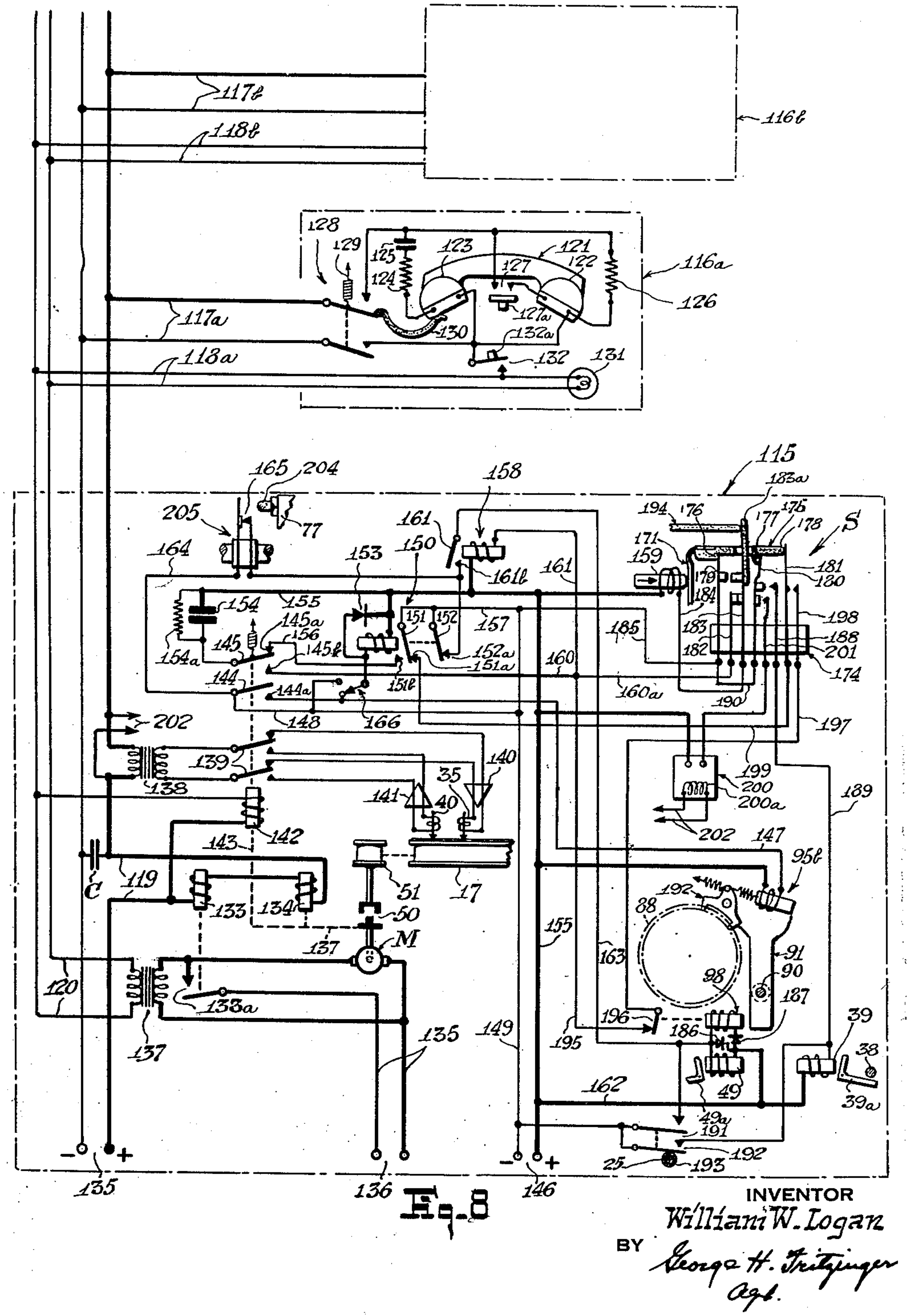
Figure 8 is a schematic circuit diagram of the electrical control circuits of the present dictating-recording system according to one embodiment of my invention.
Figure 9:
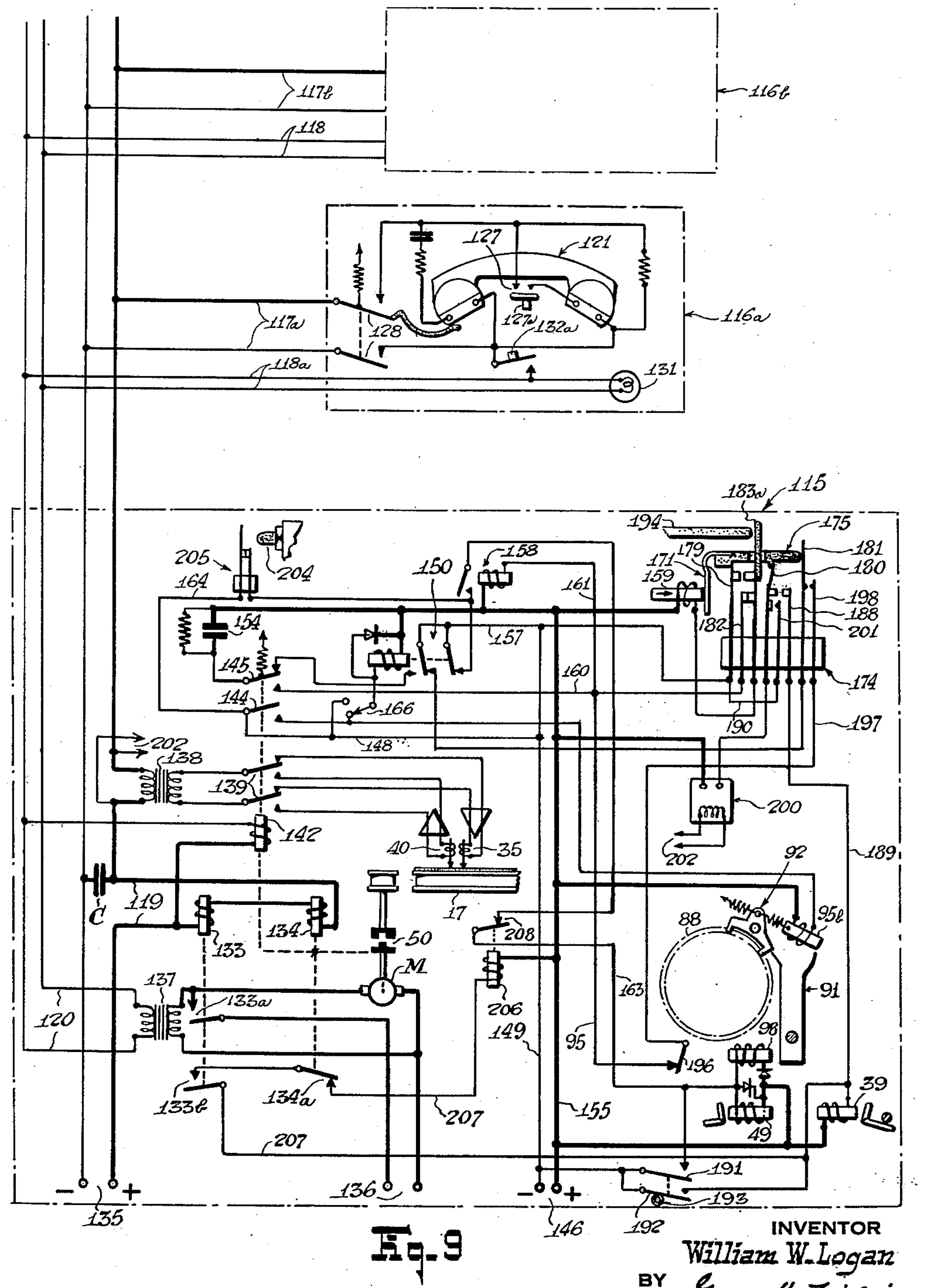
Figure 9 is another schematic circuit diagram of the electrical control circuits according to another embodiment of my invention.

The driving mechanism for rotating the turntable and moving the carriage comprises a motor M diagrammatically shown in Figures 8 and 9. The motor is coupled by a clutch 50 to a drive pulley 51 journaled in the frame plate 11. This pulley is coupled to the turntable by a belt 52 riding in a peripheral groove **17*b* of the latter. The carriage drive mechanism is operated from the turntable through a gear train 56 to a shaft 57 journaled in the frame plate 11, which shaft is coupled by spiral gearing 58 to a feed screw 53 journaled at its ends in standards 54 and 55 depending from the frame plate. At the back and front of the feed screw in parallel relation thereto are support rods 59 and 60 carried by standards extending from the frame plate. Mounted on these support rods is a lower carriage 66. This carriage carries a circular feed nut 85 which engages the feed screw 53** to cause a progressive advance of the carriage as the turntable is rotated, as is herein later described in detail.

The lower carriage 66 is coupled to the upper carriage 30 through a linear step-down transmission comprising a U-lever 67 which embraces the frame 11 from the rear end thereof and which is pivoted to this frame by a pivot screw 68. This lever has a short upper arm 69 above the frame plate coupled to the carriage 30 by a link 70, and has a long lower arm 71 below the frame plate coupled to the carriage 66 by a proportionately longer link 72.

The carriage 66 comprises a main flat, horizontal plate 73 having an upwardly-bent, forward portion 74 with a lug 75 bent rearwardly from the top edge thereof. At the rear of the main plate 73 there are lower and upper extensions 76 and 77 which embrace slidably the support rod 59. The front, vertical portion 74 has forwardly-projecting ears 78 and 79 from its side edges which are apertured to receive a sleeve 80. This sleeve is mounted on the support rod 60 to support the carriage slidably at the forward end thereof.

Figure 3:
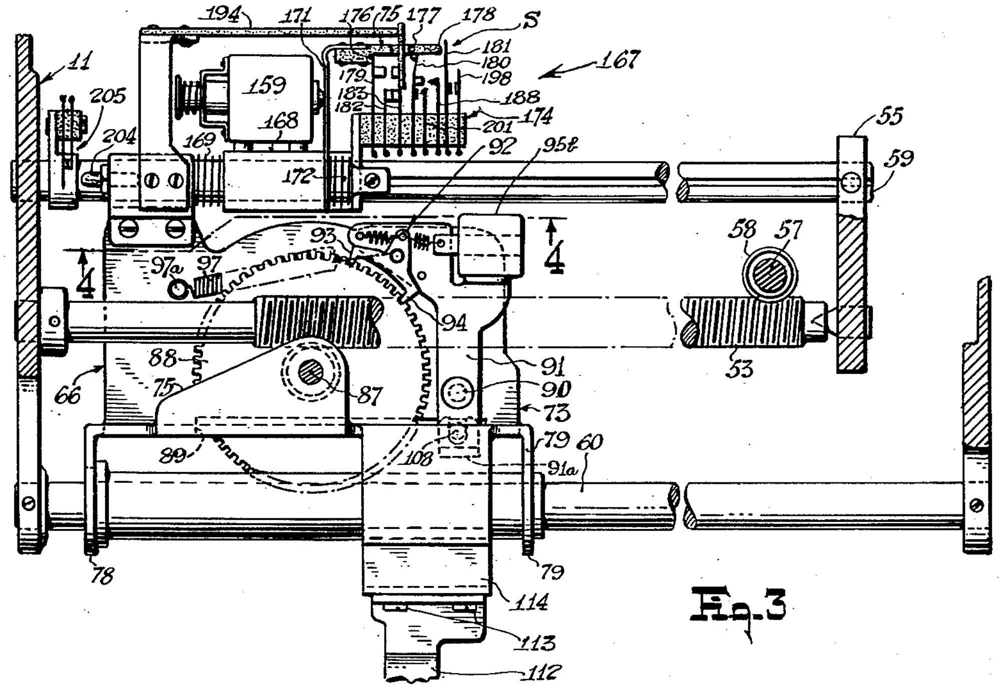
Figure 3 is a horizontal, sectional view of a lower portion of the operating mechanism of the machine taken on the line 3—3 of Figure 2.
Figure 6:
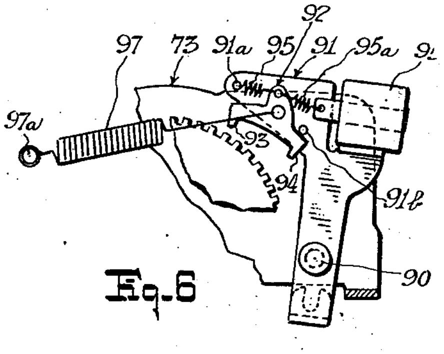
Figures 6 and 7 are fractional, plan views showing the carriage stepping mechanism respectively conditioned for advancing and backspacing.
Figure 7:
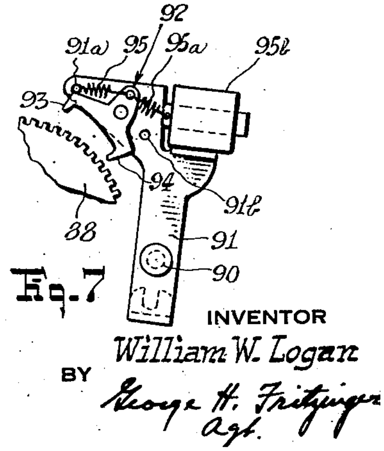

The feed nut 85 aforementioned is mounted on a pivot rod 86 held at its ends by the lower plate 73 and the upper lug 75 of the carriage. (It is to the upper end of this pivot rod that the aforementioned link 72 is pivotally secured, as shown in Figure 1.) The feed nut 85 has a hub 87 to which is secured a gear 88. This is a relatively large gear which extends through an opening 89 in the front wall of the carriage 66. As is best shown in Figure 3, a rock lever 91 is pivoted at 90 to the carriage to the right of the gear 88. A pawl 92 is pivoted at its center to the free end portion of this rock lever. This pawl has teeth 93 and 94 at its opposite ends for engaging the gear 88. The pawl can be cocked either one way or the other by two opposing tension springs 95 and 95*a*, one of which is connected between the pawl and a fixed point 91*a* on the lever 91 and the other of which is connected between the pawl and the plunger of a solenoid 95*b*. When the solenoid 95*b* is not energized, the spring 95 is controlling to cock the pawl in one direction against the stop pin 91*b* (Figure 6), but when the solenoid is energized, the pawl is cocked in the other direction against the pin 91*a* (Figure 7). As will appear, the lever 91 and pawl 92 constitute a means for moving the gear 88 by successive angular distances equal to the spacing between successive teeth as the lever 91 is reciprocated.

The lever 91 is urged towards the gear 88 by a tension spring 97 connected between the free end of the lever and a pin 97*a* on the carriage 66. When the lever 91 is rocked clockwise against the tension of the spring 97 while the directional solenoid 95*b* is energized, the pawl 92 is totally disengaged from the gear 88 and is moved by the spring 95*a* into an angular position wherein the innermost tooth 94 thereof will first engage the gear when the lever 91 is next released (Figure 7). Following such initial engagement of the gear by the tooth 94 as the lever 91 is released, the gear is turned clockwise by the distance between two successive teeth, and thereupon the second tooth 93 of the pawl also engages the gear to latch the gear against movement in either direction. This clockwise movement of the gear causes the feed nut 85 to backtrack along the feed screw and to therefore backspace the carriage 66 and the carriage 30 by one step. Conversely, if the solenoid 95*b* is not energized, the other tooth 93 will first engage the gear when the lever 91 is released as shown in Figure 6. The release of the lever 91 will in this case cause the gear to be turned counterclockwise by the peripheral distance between two successive teeth. Such counterclockwise movement of the gear will advance the carriage by one step. Thus, upon each reciprocation of the lever 91, the carriage is first released from the feed screw, is next moved by one step, and is then again coupled to the feed screw. In the normal condition, the lever 91 is released to lock the gear 88 so that the carriage will receive a progressive advance movement from the feed screw as the drive mechanism is operated.

Figure 5:
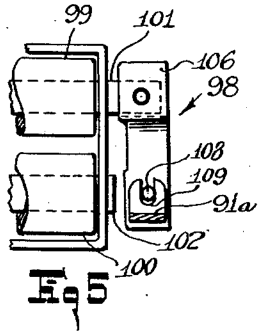
Figure 5 is a fractional, top plan view of a solenoid for operating the carriage stepping mechanism taken substantially on the line 5—5 of Figure 2.

The means for moving the lever 91 against the action of the spring 97 comprises an electromagnet 98 having two coils 99 and 100 provided with respective iron cores 101 and 102 (Figures 2 and 5). Each of these cores is riveted at one end to an iron bar or yoke 103 which is secured to the under side of the carriage 66 to support the electromagnet 98 in a horizontal plane. A U-member 105 of non-magnetic material is joined at its ends to the yoke by screws 104 (Figure 2) to form a complete envelope around the two coils. The cross portion of this U-member is apertured to receive the ends of the cores 101 and 102. One of the cores 101 extends beyond the member 105 and has an armature 106 pivoted thereto at 107. The free end of the armature is movable to and from the other core and carries an upstanding pin 108 shown in Figures 2, 3 and 5. This pin engages an open slot 109 in a downwardly offset and reversely extending end portion 91*a* of the lever 91. The armature is normally held spaced from the core 102 by the action of the spring 97 on the lever 91. When the electromagnet 98 is energized the armature is drawn against the coil 102 to disengage the pawl 92 from the gear 88. When the electromagnet 98 is next deenergized, the spring 97 propels the lever 91 to engage the pawl 92 with the gear 88 and effect one step movement of the carriage.

At the front of the machine there is a handle 112 connected at 113 to a forwardly-projecting lug 114 on the carriage 66. This handle serves only as a means for shifting the carriage by hand as during the conditioning of the machine for operation on a newly-mounted record.

The foregoing recording mechanism is intended only as illustrative since any of many different types of such mechanisms are usable with my invention hereinafter described. One embodiment of the control arrangement of my invention is shown in Figure 8 in connection with a remotely-controlled system of the type described in the aforementioned Kobler patent. This system comprises an attendant's station 115, including the recording machine and associated controls, and a plurality of dictators' stations of which two are shown and referred to as 116*a* and 116*b*, which stations comprise the dictators' equipment for operating the machine from remote points. The dictators' stations may be alike and therefore only the station 116*a* is shown in detail. The dictators' stations are connected in parallel to the recording machine by means of two branch circuits leading from each station. One branch circuit, referred to by the number 117 with the suffix letter of the respective station, constitutes a combined communication and control circuit. The other branch circuit, referred to by the number 118 with the suffix letter of the respective station, constitutes a signaling circuit. All of the branch communication circuits are connected to a main communication circuit 119, and all branch signaling circuits are connected to a main signaling circuit 120 for the machine.

The dictator's station 117*a* comprises a handset 121 of the usual telephone variety including, as transducer elements, a carbon button microphone 122 and a receiver 123. The receiver 123 is connected serially with a resistor 124 and a blocking condenser 125, and this serial arrangement is permanently connected in parallel with a resistor 126. The microphone 122 is normally out of circuit but is connectable in parallel with the resistor 126 by means of a normally-open "record" switch 127 operable by a button 127*a*. This parallel arrangement of the microphone and receiver is connected by a double-pole on-off station switch 128 across the respective branch communication circuit. The station switch is biased into closed—i. e., its "on"—position by a spring 129. However, a supporting element 130 for the handset 121 is connected to one pole element of the switch so that when the handset is mounted thereon the switch will be shifted to "off" position by the weight of the handset. The handset will be so placed on its support whenever the dictator terminates his use of the machine. Thus, the microphone and receiver of each dictator's station are normally disconnected from the machine.

In order to apprise all dictators whenever the machine is in use, each station is provided with a signal in the form, for example, of a lamp 131. This lamp is connected permanently across the respective branch signal circuit so that it will be lit whenever any one of the station switches is placed in "on" position, as will appear. At each dictator's station there is also a normally-open playback control or "listen" switch 132 operable by a button 132*a*. This listen switch is connected between the negative side of the branch communication circuit through the respective station switch and one side of the branch signaling circuit.

The control apparatus for the machine comprises a relay 133 and an electromagnet 134 connected serially in the main communication circuit 119. Energizing current for this relay and electromagnet, and for the carbon button microphone, is obtained from a low-voltage D. C. source indicated at 135. Audio currents from the remote stations are by-passed around the relay and electromagnet through a condenser C. Serially connected in the main communication circuit is an audio transformer 138 for coupling this circuit to the recorder and reproducer units as will appear.

The relay 133 has a pair of normally-open contacts 133*a* connected serially in a power circuit 135 including the motor M. This power circuit is connected to a source of A. C. power represented by the terminals 136. Paralleling the motor is the primary winding of a voltage step-down transformer 137 the secondary of which is connected to the main signal circuit 120. Thus, the motor and the signaling circuit are both energized whenever the relay 133 is operated.

The electromagnet 134 has an operative connection 137 (diagrammatically represented) to the clutch 50. This arrangement is such that the clutch is caused to be engaged whenever the electromagnet is operated.

The relay 133 and electromagnet 134 are adapted to operate respectively at lower and higher levels of direct current. When the handset is picked up to cause the respective station switch to be closed, the communication circuit is completed from the source 135 through the branch circuit, station switch and resistor 126 of the respective station. This establishes a lower level of current in the main communication circuit sufficient to operate the relay 133. This starts the motor M to place the machine in an activated condition ready for start-stop dictating operation. Upon the dictator next pressing the record button 127*a* to close the record switch, the carbon button microphone is also connected in the communication line in parallel with the resistor 126. This steps up the level of current to a value sufficient to operate also the electromagnet 134, the effect of which is to engage the clutch 50. Thus, operation of the record switch serves to start the machine.

The primary of the audio transformer 138 is connected in the communication circuit, and the secondary thereof is connectable by a double-pole switch 139 either to the recording unit 35 through an amplifier 140 or to the reproducing unit 40 through an amplifier 141. This switch is part of a record-reproduce relay 142, hereinafter referred to simply as the RR relay. This relay is normally in its record position shown in Figure 8. When the relay is operated, the switch 139 is thrown to reproducing position to connect the communication circuit to the reproducer.

Upon closing the listen switch 132 at a dictator's station, an energizing circuit for the RR relay 142 is completed from the positive side of the D. C. source 135 through the relay coil to one side of the signal circuit, and thence through the listen switch and the station switch to the negative side of the D. C. source 135. The RR relay 142 is therefore operated whenever the listen switch is closed.

The RR relay 142 has also an operative connection 143 (diagrammatically shown) with the clutch 50 so that the clutch will also be engaged to start the machine whenever the listen switch is closed. Thus, the machine is shifted to reproducing condition and is started when the listen button is depressed.

In recording machines which operate by cutting or embossing the record medium, it is customary to offset the reproducer a small distance back from the recorder with respect to the direction of advance of the carriage so that a mere shifting of the machine into reproduce condition and re-starting of the machine will start playback from a backspaced point. The present machine is to be considered as having such offsetting of the reproducer from the recorder.

It is, however, often desirable to begin playback from a farther point of backspacing than that represented by the aforestated offset. For this reason the present invention provides a facility for also backspacing the carriage by means under the sole control of the listen button, the operation being such that upon first pressing the button and holding the same down, the machine is simply shifted into reproducing condition and started, but upon each releasing of the button and subsequent repressing thereof within a preset time interval the carriage is backspaced by one step.

The control means for so backspacing the carriage comprises two additional switch poles 144 and 145 in the RR relay 142. The pole 144 controls the directional solenoid 95*b* of the carriage stepping mechanism hereinbefore described. For instance, this solenoid is connected in a circuit leading from the positive side of a D. C. source 146—which may be the same as the source 135—thence by a lead 147 to the contact 144*a* associated with the pole 144, and from this pole by leads 148 and 149 to the negative side of the source 146. Since the pole 144 and contact 144*a* are closed as the RR relay is operated, the directional solenoid 95*b* is moved to its backspacing position as the listen button is pressed.

When the pole 144 makes with the contact 144*a* it also completes connection of a relay 150 across the source 146. This is a preparatory relay operated to set up the circuitry so that upon the second pressing of the listen button the carriage will be backspaced. The relay 150 has two poles 151 and 152. The pole 151 normally makes with a contact 151*a* and is moved to contact 151*b* as the relay is operated; however, the pole 152 simply breaks from its associated contact 152*a* as the relay is operated. Across the relay coil is a rectifier 153 which is poled in inverse relation to the polarity of the voltage applied to the preparatory relay so that it will serve to delay the drop-out of the relay 150 when the power thereto is removed.

The fourth pole 145 of the RR relay 142 is normally closed with the contact 145*a* and is moved to contact 145*b* as the RR relay is operated. When the RR relay 142 is released and the preparatory relay 150 is still operated—this being the situation which exists at the instant the listen switch 132 is released and which exists until the preparatory relay 150 drops out—a condenser 154, shunted by a resistance 154*a* of relatively high value, is connected across the source 146 via a lead 155, the condenser, pole 145 and contact 145*a*, lead 156, contact 151*b* and pole 151 of the preparatory relay 150, and leads 157 and 149. This charging of the condenser has effect only when the listen button is next re-pressed, for then the pole 145 of the RR relay makes with the contact 145*b* to connect the charged condenser across both a relay 158 and a marker relay 159 (of an advance marking device hereinafter described) to provide for a pulse operation of each relay. The connection of the condenser 154 across the relay 158 is via lead 155, the condenser, pole 145 and contact 145*b*, and leads 160 and 161. The relay 158 has a pole 161 and contact 161*b* which are normally disengaged but which are momentarily closed by the pulse operation of the relay. When this pole and contact are closed they connect the stepping solenoid 98 across the source 146 via lead 162, the stepping solenoid, lead 163, pole 161 and contact 161*b*, lead wire 164 serially including a backspacing limit switch 165 hereinafter described, and the leads 148 and 149. The resultant momentary actuation of the solenoid 98 causes the stepping lever 91 to be drawn away from the gear 88 and to be thereupon released to cause the carriage to be backspaced by one step. Thus, upon successively re-pressing the dictator's listen button after its initial release, the carriage stepping mechanism is pulse operated to backspace the carriage by successive steps.

Since the preparatory relay 150 is re-energized each time the listen switch is re-pressed and remains actuated for a moment following each release of the listen switch, the condenser 154 is recharged upon each such release via pole 145 and contact 145*a* of the RR relay 142 and contact 151*b* and pole 151 of the preparatory relay 150. It is desired, however, that the condenser be not charged whenever the dictator initiates a subsequent independent listening back operation, as after some further recordation of dictation, so that backspacing will not occur during the initial pressing of the listen button for such operation. For this reason the discharge resistor 154a is connected across the condenser 154. The time constant of this resistor-condenser combination may typically be of the order of a few seconds.

If the recording machine were adapted for operation on a magnetic record medium, the recording and reproducing units would typically be in line and successive backspacing of the carriage would be desired starting with the initial pressing of the dictator's listen switch. This would be accomplished in the present system simply by connecting the circuit of the preparatory relay 150 permanently across the source 146. This may be accomplished by providing a switch 166 in this circuit which is normally positioned to connect with the lead wire 147 but which can be shifted to connect with the lead wire 148 running to the negative side of the power source 146. When the switch 166 is so thrown to connect the preparatory relay 150 permanently across the source 146, the condenser 154 is maintained in charged condition while the listen button is released and is effective upon any pressing of the listen button to operate the relay 158 and provide therefore for a step actuation of the carriage stepping mechanism. However, in the following description of the present invention switch 166 is considered as being in the position shown in Figure 8 so that backspacing of the carriage will start only upon the second actuation of the listen switch in any one "listening back" operation.

Figure 4:
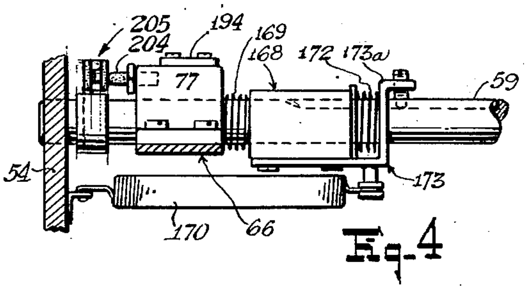
Figure 4 is a fractional, sectional view taken on the line 4—4 of Figure 3.

The marking relay 159 is part of an advance marking device 166 shown in detail in Figure 3. This advance marking device comprises a slide 168 on the support rod 59 ahead of the carriage 66. A compression spring 169 loosely surrounds the rod 59 between the carriage and the slide to provide a yieldable means for pushing the slide as the carriage is advanced. A long tension spring 170 (Figures 2 and 4) is connected between the slide and the left side of the frame plate 11 to exert a constant force on the slide tending always to hold it against the carriage so that the slide will normally follow the latter. However, a means is provided for latching the advance slide against being returned as the carriage is back-spaced so that the slide will define the prior position of farthest advance of the carriage so long as the carriage is backspaced. This latching means may, for example, be in the form of a plate 171 of spring material having an aperture receiving the support rod 59 without play. The plate is pressed against the leading face of the slide 168 by a compression spring 172 interposed between the plate and an upstanding arm 173a ahead of the slide, this arm being part of a bracket 173 secured to the under side of the slide. So long as the plate is in this upright position defined by even abutment thereof against the leading face of the slide it provides no restraint on the forward and backward movement of the slide. However, mounted on the slide is the aforementioned marking relay 159. This relay has an armature 159a which is operated forwardly against the upper free part of the plate 171 as the relay is energized. By this action of the armature against the plate the latter is cocked to bind it against the rod 59 and thereby latch the slide. As beforementioned, the marking relay is energized by the discharge of the condenser 154 as an incident to the initial backspacing of the carriage. Thus, the advance slide is latched against backspacing movement with the carriage and will define the prior position of farthest advance reached by the carriage while the latter is backspaced.

Secured to the arm 173 of the advance marker is a multiple switch S comprising a stack 174 of insulating plates holding a series of switch blades. Secured to the upper end of the spring-locking plate 171 is a cross member 175 of insulating material having a series of abutments

176, 177 and 178 for operating the respective switch blades 179, 180 and 181. The connection of the condenser 154 across the relay 159 for operating the latter as before described is by way of the lead wires 160 and 160a, switch blades 182 and 183 of the switch S and lead wire 184. When the marker relay 159 is operated, the switch blade 183 is propelled to the right by the abutment thereagainst of the switch blade 179. This breaks the contact between the switch blades 182 and 183 to open the circuit of the relay 159, but at the same time it makes contact between the switch blades 179 and 183 to connect the marker relay directly across the D. C. source 146 by way of a lead wire 185 connected from the switch blade 179 to the negative lead wire 149. Thus, the initial operation of the marker relay 159 by the condenser 154 provides a holding circuit to maintain this relay operated until the holding circuit is subsequently broken.

During each backspacing of the carriage both the reproducer and recorder are raised from the record. This is done by actuation of the solenoids 39 and 49 mounted on the left side of the carriage. The solenoid 49 is connected in parallel with the stepping solenoid 98. Since the solenoids 49 and 98 are thus operated simultaneously but backspacing of the carriage does not occur until the stepping solenoid 98 is released, it follows that the reproducer is raised and centered before the carriage backspacing movement begins. However, in order to delay the release of the solenoid 49 without effecting the release of the stepping solenoid 98 so as to maintain the reproducer raised during the movement of the carriage, a rectifier 186 is connected across the solenoid 49 and is poled inversely with respect to the polarity of the D. C. potential applied across the solenoid, and a rectifier 187 is connected serially to the stepping solenoid and is poled in the direction of polarity of the D. C. potential applied across this solenoid, the purpose of the latter being to prevent the stepping solenoid from interfering with the slow release of the solenoid 49. The operation of the solenoid 39 to raise the recorder whenever the carriage is backspaced is controlled by the marker relay 159. For instance, as the marker relay is operated, it closes the switch blade 180 with an adjacent blade 188 to close the circuit of the solenoid 39 across the D. C. source 146 via the lead wire 162, the solenoid 39, lead wire 189, switch blades 188 and 180, jumper 190, and leads 185 and 149. Since the marker relay 159 is locked by its holding circuit as soon as it is operated, the solenoid 39 is likewise held operated to maintain the recorder raised from the record at all times while the carriage is backspaced.

If the dictator should terminate a backspacing operation short of reaching the end of his previously-recorded dictation, the carriage will have to be moved beyond its prior position of farthest advance before he can resume the recording operation. Such farther advance of the carriage while the advance marker is still latched is made possible by the interposition of the compression spring 169 between the carriage and the advance marker. It is necessary however that the advance marker become unlatched when the carriage is moved beyond this position by a slight margin. This is accomplished by the impingement of the insulating arm 194 on the carriage 66 against an extending insulating finger 183a of the switch blade 183. During the normal advance of the carriage the arm 194 and finger 183a are separated only by a slight spacing, but as the advance marker relay 159 is operated the finger 183a is shifted ahead by a small amount. When the carriage is advanced from a backspaced position beyond its prior position of farthest advance by the aforestated amount, the arm 194 will abut against the switch blade finger 183a. In the slight additional forward movement of the carriage the switch blade 183 will be displaced farther ahead to break its contact with the switch blade 179. As this occurs, power is cut off from the marker relay 159 to unlatch the advance marker and to restore the marker switch S to its normal position shown in the drawings.

If the dictator backspaces the carriage and then listens to only a small intermediate portion of his dictation, he will want to be able to advance the carriage quickly beyond its prior position of farthest advance so that he may continue his recording operation where he last left off without delay. Such quick return of the carriage is made possible with the aid of the advance marker, and is initiated in accordance with my invention simply by the dictator's releasing the listen switch 132 for a time interval at least greater than the release time of the preparatory relay 150. Upon such release of the listen switch both the RR relay 142 and the preparatory relay 150 will have dropped out into the positions shown in Figure 8, but the advance marker relay 159 will be still operated in view of the carriage being in a backspaced position. Under these conditions the directional solenoid 95*b* will be released into its forward position and the stepping solenoid 98 will be repeatedly actuated as follows: the relay 158 is energized from the source 146 via the lead 155, the relay 158, leads 161 and 195, switch 196 of the stepping solenoid 98, lead 197, switch blades 198 and 181 of the multiple switch S, the lead 199, contact 151*a* and pole 151 of relay 150, and leads 157 and 149. As soon as the relay 158 is energized, its contacts 161 and 161*b* are closed to start the stepping solenoid. However, as an incident of the operation of the stepping solenoid, the contacts 196 thereof are broken to cause the relay 158 to drop out, and this in turn causes the contacts 161 and 161*b* of the latter relay to disengage and cause the stepping solenoid 98 to drop out. As the latter drops out, the carriage is advanced by one step and the contacts 196 are reclosed to restart the whole cycle over again. As a result, the stepping solenoid is repeatedly actuated to step the carriage ahead at a fast rate. When the carriage has been advanced beyond its prior position of farthest advance defined by the advance marker, the finger 194 will have actuated the switch finger 183*a* to break contact between the switch blades 179 and 183. This causes the marker relay 159 to drop out, the effect of which is to unlatch the advance marker and to return the marker switch S to the position shown in Figure 8. Such return of the switch S causes the switch blades 181 and 198 to open and break the circuit of the relay 158, and this in turn causes the contacts 161 and 161*b* of the latter relay to open and drop out the stepping solenoid 98 as well as the reproducer-raising solenoid 49; furthermore, the return of the marker switch S opens the switch blades 180 and 188 to drop out the recorder-raising solenoid 39, and reconnects the switch blades 182 and 183 to prepare the circuit of the marker relay 159 for subsequent operation by discharge of the condenser 154.

The aforedescribed automatic advance of the carriage from a backspaced position will also be initiated by a dictator returning his handpiece onto its support since that will cause the station switch to open to drop out the RR relay 142 as well as the preparatory relay 150, the effect of which is to start the carriage stepping solenoid 98 in the manner above-described.

As a means for apprising a dictator as to whenever the carriage is in a backspaced position, there is provided a signaling means comprising, for example, a vibrator 200 connected from the positive lead 155 of the power source 146 to a switch blade 201 of the marker switch S. When the marker switch is operated, the blade 201 makes contact with the switch blade 180 connected by the jumper 190 and lead 185 to the negative lead 149 of the source 146. The vibrator has an output winding 200*a* connected by leads 202 across the audio transformer 138 to provide a low-level tick signal in the communication circuit which will be heard by the dictator at his receiver so long as the carriage is backspaced from the advance marker.

In multiple-station remotely-controlled dictation-recording systems of the type herein described it is desirable to so limit the backspacing of the carriage that a subsequent dictator cannot possibly listen back to the dictation of a prior dictator. This feature is described and claimed in the aforementioned co-pending application of Richard Kobler, Serial No. 436,796, filed June 15, 1954. In order to incorporate this feature into the present system, a rear marker 205 is provided behind the carriage 66 but this marker is herein only diagrammatically shown since reference to the aforestated Kobler application may be had as to details. Suffice to say that the marker is movably mounted on the rod 59 and is urged forwardly to follow the carriage 66 as the carriage is advanced; however, whenever a dictator picks up his handpiece to start use of the machine, the closing of the station switch will cause the marker to be locked to the rod 59 so that it will be held stationary as the carriage proceeds ahead during the ensuing recording operation. If the dictator should attempt subsequently to backspace the carriage beyond its prior starting position when he began use of the machine, an abutment 204 on the carriage will impinge against a blade of the switch 165 on the rear marker 205 to open this switch. The switch 165 is connected in the circuit 164 leading from the switch 161 of the relay 158 to the negative side of the power source 146 so that, as the switch 165 is opened, the energizing circuit for the stepping solenoid 98 is broken to prevent further backspacing of the carriage.

As has been pointed out, the preparatory relay 150 is held operated for a moment after each release of the listen switch in order to recharge the condenser 154 and render it effective to cause the stepping solenoid 98 to be operated momentarily to backspace the carriage by one step each time the listen switch 132 is re-pressed, provided the carriage has not been backspaced to the rear marker switch 165. As has been further pointed out, fast advance of the carriage is to start when the preparatory relay drops out following the release of the listen switch. In order that a circuit will be provided for the stepping solenoid 98 to start the fast advance when the preparatory relay drops out while the rear marker switch is held open, the preparatory relay 150 is provided with a second switch 152—152*a* which is connected in parallel with the rear marker switch 165 and closed as the preparatory relay drops out.

Whenever the record-clamping mechanism is released, the concomitant raising of the lifting arm 25 as before described will close a pair of switches 191 and 192 by abutment of an insulating sleeve 193 on this arm against the poles of these switches (Figure 1*a*). This closure of these switches also completes the connections across the D. C. source 146 of the recorder and reproducer lifting solenoids 39 and 49 as well as of the stepping solenoid 98. Thus, whenever a record is unclamped, the translating units are raised and the carriage is freed from the feed mechanism to permit it to be moved freely by hand across the record. This is necessary in the conditioning of the machine for use on a newly-mounted record. The extending member of the lifting arm 25 which serves to raise the recorder and reproducer mechanically as a record is unclamped is provided so that these functions will be performed were a record unclamped when the machine is not connected to a source of power.

The alternative embodiment shown in Figure 9 differs from that shown in Figure 8 only in a small detail which is adapted to provide for fast advancement of the carriage from a backspaced position when the dictator releases his listen button and subsequently presses the record button. To this end, the relay 133 is provided with a second normally-open switch 133*b*, the electromagnet 134 is provided with a normally-closed switch 134*a*, and an additional relay 206 is provided. The relay 206 is connected in a circuit 207 running from the positive lead 155 of the source 146 to the lead 189. This circuit 207 serially includes both of the switches 133b and 134a. Since the lead 189 is connected to the negative lead 149 of the source 146 via the switch blades 188 and 180 of the marker switch S whenever the carriage is backspaced, it follows that the relay 206 will be energized only when (1) the carriage is backspaced, (2) the machine is activated by actuation of the relay 133, and (3) the machine is not running as represented by unactuation of the start-stop electromagnet 134. Energization of the relay 206 is adapted to prevent operation of the stepping solenoid 98 by reason of this relay having a normally-closed switch 208 connected in the circuit 163 leading from the stepping solenoid. However, if the dictator releases the listen switch to drop out the preparatory relay 150 after backspacing the carriage, and thereupon presses the record switch 127 to actuate the electromagnet 134, the circuit of the relay 206 will be opened to cause the contacts 208 to close to start the stepping solenoid 98. Thus, upon the dictator releasing the listen switch and subsequently pressing the record switch, the carriage will be advanced at a fast rate so long as the record switch is held depressed until the carriage has moved past its prior position of farthest advance to drop out the marker relay 159 in the manner hereinbefore described. As before, when the marker 159 is dropped out, the advance marker is released and the machine is stopped and conditioned for recording, the same as is hereinbefore described in connection with my first embodiment.

The embodiments of my invention herein particularly shown and described are intended to be illustrative and not limitative of my invention since the same are subject to changes and modifications without departure from the scope of my invention, which I endeavor to set forth in the following claims.

I claim:

1. In a dictating machine including a rotatable supporting means for a record, a record-cooperable translating means including recording and reproducing units, a movably-mounted carriage for one of said means, and means for forwardly driving said carriage to cause said translating means to progressively scan the record: the combination of an audio system connected to said translating means and including a selector switch means shiftable into record and reproduce positions to condition the audio system respectively for recording and reproducing; means for biasing said selector switch means into record position; means for backspacing said carriage; start-stop means for said driving means; a record control operable to shift said start-stop means to start position; a reciprocable listen control biased into unoperated position; and means for conditioning said machine for reproducing selected portions of recorded dictation solely by said listen control, comprising means for recurrently operating said back-spacing means by repeated movement of said listen control into operated position and means for causing said selector switch to be shifted to reproduce position and said start-stop means to said start position whenever said listen control is held in operated position.

2. In a dictating machine including a rotatable suppotring means for a record, a record-cooperable translating means including recording and reproducing units, a movably-mounted carriage for one of said means, and means for forwardly driving said carriage to cause said translating means to progressively scan the record: the combination of an audio system connected to said translating means and including a selector switch means shiftable into record and reproduce positions to condition the audio system respectively for recording and reproducing; means for backspacing said carriage; start-stop means for said driving means; means for operating said machine as a recording instrument; and means for operating said machine as an instrument for reproducing selected portions of recorded dictation, comprising a reciprocable listen control having neutral and operated positions and means for controlling said backspacing means, selected switch means and start-stop means solely by said listen control for causing said reproducing unit to engage the record at points backspaced from the position of farthest advance of the recording unit according to the number of times said listen control is repeatedly moved from neutral to operated position and for causing said drive means to be started and said audio system to be in reproduce condition so long as said listen control is held in operated position.

3. In a dictating machine including a rotatable supporting means for a record, a record-cooperable translating means including recording and reproducing units, said reproducing unit being offset backwardly from said recording unit with respect to the direction of advance of the units across a record, a movably mounted carriage for one of said means, and means for forwardly driving said carriage to cause said translating means to progressively scan the record: the combination of means for operating said machine as a recording instrument; and means for operating said machine as a reproducing instrument to enable a dictator to listen back to selected portions of recorded dictation, comprising operable means for backspacing said carriage, a manual control member, means having a normally-ineffective condition for operating said backspacing means, preparatory backspacing control means actuated upon a first operation of said manual control member, and means controlled by said manual control member and said preparatory means for enabling said operating means to cause said backspacing means to be operated by one step upon each subsequent repeat operation of said manual control member.

4. The combination set forth in claim 3 comprising time-responsive means for restoring said operating means to ineffective condition upon elapse of a predetermined time interval following a release of said manual control member.

5. In a dictating machine including recording and reproducing apparatus having record-scanning means including a movable carriage adapter selectively to be progressively advanced for scanning and to be backspaced for a repeat scanning operation: the combination of a backspacing mechanism adapted to be pulse-operated to backspace the carriage by successive steps; a condenser; a repeatedly-operable control member; a backspacing preparatory means controlled by said control member; means to delay the release of said preparatory means when said control member is released; means for causing said condenser to be charged upon release of said control member while said preparatory means is operated; means for causing a pulse operation of said backspacing means upon each operation of said control member while said condenser is in a charged condition; and a resistor for shunting said condenser to discharge the same and render the condenser ineffective to cause operation of said backspacing means upon elapse of a predetermined time interval following the release of both said control member and preparatory means.

6. In a dictating machine including a rotatable supporting means for a record, a record-cooperable translating means including recording and reproducing units, a movably-mounted carriage for one of said means, and means for forwardly driving said carriage to cause said translating means to progressively scan the record: the combination of an audio system connected to said translating means and including a selector switch means shiftable into record and reproduce positions to condition the audio system respectively for recording and reproducing; means for operating said machine as a recording instrument; and means for operating said machine as an instrument for reproducing selected portions of recorded dictation, comprising a push-type listen control biased into unoperated position, means for backspacing said carriage, start-stop means for said drive means, means for operating said backspacing means by one step upon pushing said listen control into operated position and means responsive to said listen control being held in operated position for causing said selector switch to be retained in reproduce position and said start-stop means in start position.

7. The combination as set forth in claim 6 including an advance marker for defining positions of farthest advance reached by said carriage; and means controlled by said marker for feeding a low-level signal into said audio system while said carriage is backspaced.

8. In a dictating machine including a rotatable supporting means for a record, a record-cooperable translating means including recording and reproducing units, a movably-mounted carriage for one of said means, and means for forwardly driving said carriage to cause said translating means to progressively scan the record: the combination of an audio system connected to said translating means and including a selector switch means shiftable into record and reproduce positions to condition the audio system respectively for recording and reproducing; means for operating said machine as a recording instrument; means for operating said machine as an instrument for reproducing selected portions of recorded dictation comprising a repeatedly-operable listen control biased into unoperated position, means responsive to said listen control for engaging said reproducing device with the record at points backspaced from the position of farthest advance of the recording device according to the number of times the listen control is repeatedly moved from unoperated to operated position and for causing said selector switch to be shifted to reproduce position and said drive means to be started when said listen control is held in operated position; means for restoring said recording device into engagement with the record at a point beyond its prior position of farthest advance; and means responsive to release of said listen control for causing said restoring means to be put into operation.

9. In a dictating machine including a rotatable supporting means for a record, a record-cooperable translating means including recording and reproducing units, a movably-mounted carriage for one of said means, and means for forwardly driving said carriage to cause said translating means to progressively scan the record: the combination of an audio system connected to said translating means and including a selector switch means shiftable into record and reproduce positions to condition the audio system respectively for recording and reproducing; a dictator's station comprising a record control and a listen control and including also a dictator's microphone and receiver and an on-off station switch; means for causing said dictator's station to be operatively connected to said machine according to whether said station switch is in on or off position; means for backspacing said carriage; means for rapidly advancing said carriage to its prior position of farthest advance; and means responsive to release of said listen control while the carriage is in a backspaced position for starting said rapid-advancing means.

10. In a dictating machine including a rotatable supporting means for a record, a record-cooperable translating means including recording and reproducing units, a movably-mounted carriage for one of said means, and means for forwardly driving said carriage to cause said translating means to progressively scan the record: the combination of an audio system connected to said translating means and including a selector switch means shiftable into record and reproduce positions to condition the audio system respectively for recording and reproducing; a dictator's station comprising a record control and a listen control and including also a dictator's microphone and receiver and an on-off station switch; means for causing said dictator's station to be operatively connected to said machine according to whether said station switch is in on or off position; means for backspacing said carriage; means for rapidly advancing said carriage to its prior position of farthest advance; and means effective upon return of said station switch to off position while said carriage is in a backspaced position for starting said rapid-advancing means.

11. In a dictating machine including a rotatable supporting means for a record, a record-cooperable translating means including recording and reproducing units, a movably-mounted carriage for one of said means, and means for forwardly driving said carriage to cause said translating means to progressively scan the record: the combination of an audio system connected to said translating means and including a selector switch means shiftable into record and reproduce positions to condition the audio system respectively for recording and reproducing; a dictator's station comprising a record control and a listen control and including also a dictator's microphone and receiver and an on-off station switch; means for causing said dictator's station to be operatively connected to said machine according to whether said station switch is in on or off position; means for backspacing said carriage; means for rapidly advancing said carriage to its prior position of farthest advance; and means responsive to release of said listen control and to subsequent operation of said record control while said carriage is in a backspaced position for starting said rapid-advancing means.

12. In a dictating machine including a rotatable supporting means for a record, record-cooperable translating means, a carriage for one of said means mounted for traveling movement, and drive means for progressively advancing said carriage and for rotating said supporting means to provide for a progressive scanning of the record by said translating means: the combination of means for operating said machine to record dictation; an advance marker for said carriage moved therewith as the carriage is advanced; a listen control operable for conditioning said machine to reproduce portions of recorded dictation; means for locking said advance marker by operation of said listen control; a pair of cooperable elements respectively on said carriage and marker, one of said elements being mounted for shifting movement in directions of movement of the carriage; means for shifting said one element as said marker is locked; and means responsive to further shifting of said one element caused by abutment thereagainst of the other of said elements as said carriage is moved beyond its prior position of farthest advance for unlocking said marker.

13. The machine set forth in claim 12 wherein said listen control is adapted to maintain said machine in operating condition for reproducing only so long as said control is held operated; means for backspacing said carriage step by step in response to repeated operation of said listen control; means for automatically advancing said carriage from back-spaced positions after return of said listen control to unoperated position; and means for stopping said automatic advancing means as an incident to the unlocking of said marker.

14. In a dictating machine including a rotatable supporting means for a record, record-cooperable translating means, a carriage for one of said means mounted for traveling movement, and drive means for progressively advancing said carriage and for rotating said supporting means to provide for a progressive scanning of the record by said translating means: the combination of means for shifting said carriage step by step; direction control means operable selectively for causing said shifting means to move said carriage backwardly and forwardly; a record control for operating said machine as a recording instrument; a reproduce control for operating said machine as a reproducing instrument, including means for actuating said shifting means to backspace said carriage by one step with each operation of said reproduce control and for placing said machine in operating condition for reproducing while said reproduce control is held operated; and means controlled by said reproduce control for repeatedly actuating said shifting means with said directional control operated to cause said carriage to be stepped ahead upon release of said reproduce control while said carriage is in a backspaced position.

15. In a dictating machine including a rotatable supporting means for a record, record-cooperable translating means, a carriage for one of said means mounted for traveling movement, and drive means for progressively advancing said carriage and for rotating said supporting means to provide for a progressive scanning of the record by said translating means: the combination of means for shifting said carriage step by step; a directional control for said shifting means operable to cause the shifting means to advance or backspace the carriage; a listen control for conditioning said machine to operate as a reproducing instrument; means for repeatedly actuating said shifting means in response to repeated operation of said listen control and for causing said directional control to be in backspaced position each time said listen control is operated; means for causing said shifting means to be actuated recurrently with said directional control in an advance position upon release of said listen control while said carriage is backspaced; an advance marker for defining positions of farthest advance of said carriage; and means controlled by said advance marker for stopping the automatic advance of the carriage when the carriage reaches a predetermined position with respect to the marker.

16. In a dictating machine including a rotatable support, a record-cooperable translating device, a carriage for said translating device mounted for traveling movement along said support, and a drive mechanism for rotating said support and concurrently advancing said carriage: the combination of means associated with said drive for starting and stopping said support and carriage; a disengageable drive connection in said drive mechanism leading to said carriage; a backspacing device operable to disconnect said drive connection, backspace said carriage by one step and restore said drive connection in the sequence named; a reciprocable manual control biased into unoperated position; and means controlled by said manual control as the manual control is moved to and held in operation position to operate said backspacing device and to operate said start-stop means to start position.

17. In a dictating machine including a rotatable support, a record-cooperable translating device, a carriage for said translating device mounted for traveling movement along said support, and a drive mechanism for rotating said support and concurrently advancing said carriage: the combination of means associated with said drive for starting and stopping said support and carriage; a disengageable drive connection in said drive mechanism leading to said carriage; a backspacing device operable to disconnect said drive connection, backspace said carriage by one step and restore said drive connection in the sequence named; a dictate control member; a listen control member; means to cause operation of said start-stop means to start position as said dictate control member is depressed; and means to cause both said start-stop means to be operated to start position and said backspacing device to be operated as said listen control member is depressed.

18. In a dictating machine including a rotatable support, a record-cooperable translating device, a carriage for said translating device mounted for traveling movement along said support, and a drive mechanism for rotating said support and concurrently advancing said carriage: the combination of means associated with said drive for starting and stopping said support and carriage; a disengageable drive connection in said drive mechanism leading to said carriage; a backspacing device effective on each energization thereof to disconnect said drive connection, backspace said carriage by one step and restore said drive connection in the sequence named; a dictate control member; a listen control member; means to cause said start-stop means to be moved to start and stop positions as said dictate control member is depressed and released; record-reproduce means selectively operable to condition the machine for recording or reproducing; means for repeatedly energizing said backspacing device upon repeated operation of said listen control member; and means controlled also by said listen control member to cause said start-stop means to be moved to start and stop positions and said record-reproduce means to be moved to reproduce and record conditions respectively as said control member is depressed and released.

References Cited in the file of this patent

UNITED STATES PATENTS 2,200,351 Whitehead ------------ May 14, 1940